United States Patent Office.

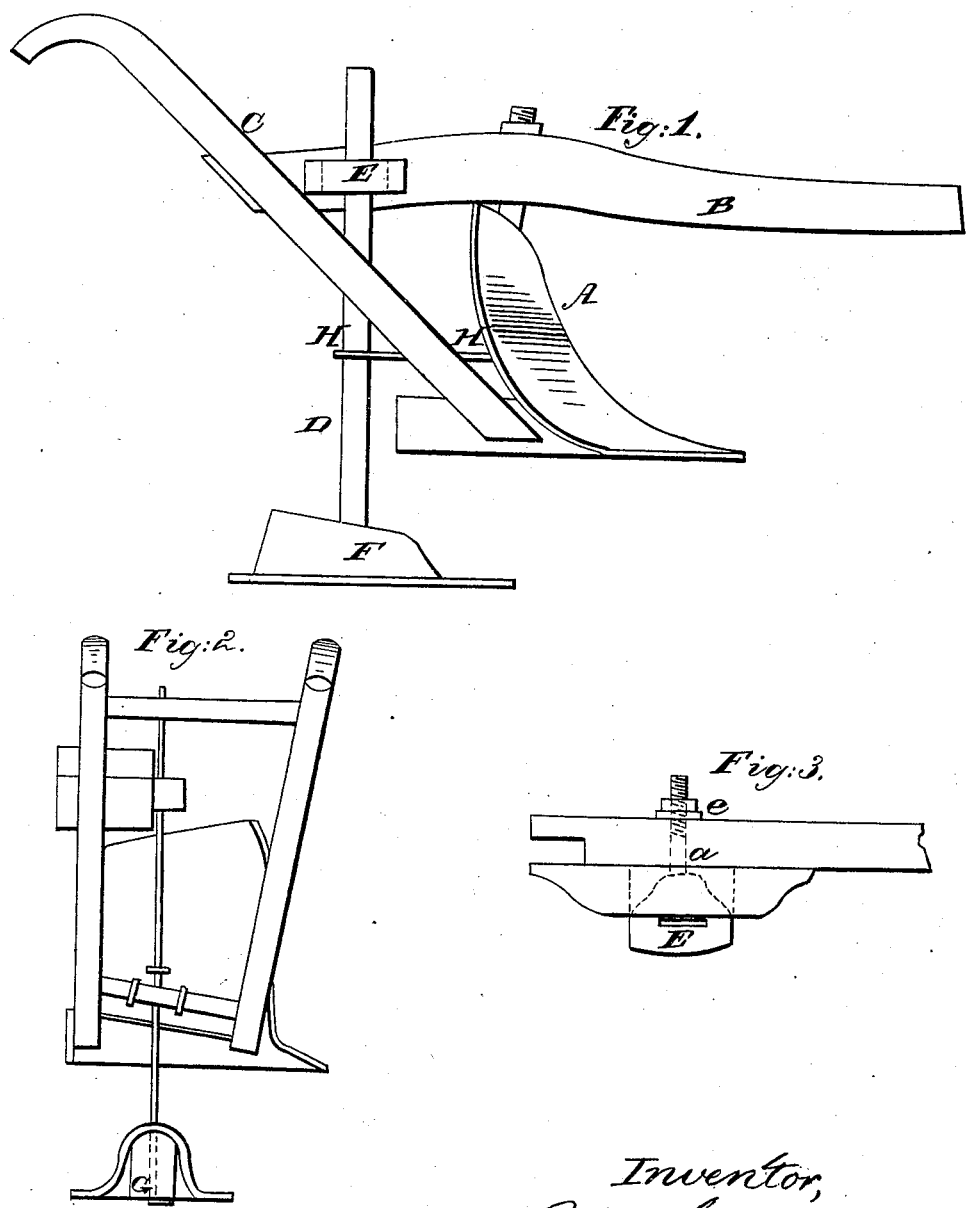

P. M. GILBERT, OF KEWANEE, ILLINOIS.

Letters Patent No. 60,875, dated January 1, 1867; antedated July 1, 1866.

IMPROVEMENT IN PLOUGHS.

The Schedule referred to in these Letters Patent and making part of the same.

TO ALL WHOM IT MAY CONCERN:

Be it known that I, P. M. GILBERT, of Kewanee, county of Henry, and State of Illinois, have invented certain new and useful Improvements in Ploughs; and I do hereby declare that the following is a full, clear, and exact description of the same, reference being had to the accompanying drawings, and to the letters of reference marked thereon.

In the annexed drawings, making part of this specification, A represents any ordinary mould-board plough, with the usual beam B and handles C. D represents a metallic bar, which stands in a vertical position behind the plough, with its upper end passing through a clasp, E, which said clasp is secured to the beam of the plough by means of a rod, a, which forms a part of it, or is secured to it. The rod a passes through the beam, and being provided on its outer end with a screw-thread, over which a nut passes, the clasp, and with it the bar D, are drawn tightly against the side of the beam, and thus the said bar is stationed at any desired point. Upon the lower end of the bar D is secured a mole or subsoil plough, made in any of the usual and known ways, or both at the same time. The subsoil plough here is made open or hollow on its under side, so as to receive the mole within it or under it. The bar D passes through the subsoil plough F, and also through the mole, and has its lower end bent so that it cannot draw out at that end. A set-screw will or can be used for stationing the mole to the bar. A loop of metal, marked H, passes around the bar D, and then around a brace on the mould-board plough A, for the purpose of holding said bar D in its place, and against which it will bear in drawing through the earth. This subsoil and mole plough can be used upon any ordinary mould-board plough, or any gang plough, by using the brace or loop H and the clasp E.

What I claim as new, and desire to secure by Letters Patent, is—

The arrangement and combination of the subsoil plough F, the bar D, loop H, and clasp E, with the beam of any ordinary mould-board or gang plough, as and for the purpose specified.

In witness that I claim the foregoing, I have hereunto set my hand in the presence of witnesses.

P. M. GILBERT.

Witnesses:
   JOHN E. DECKER,
   WILLIAM C. WOOD.